United States Patent [19]

Di Bella

[11] Patent Number: 4,830,405

[45] Date of Patent: May 16, 1989

[54] METHOD OF VALIDATING DATA ENTERED ON A TICKET AND THE LIKE

[75] Inventor: Antonio Di Bella, Catania, Italy

[73] Assignee: ChetJack Limited, London, England

[21] Appl. No.: 133,013

[22] Filed: Dec. 15, 1987

[30] Foreign Application Priority Data

Mar. 17, 1987 [IT] Italy .............................. 19728 A/87

[51] Int. Cl.⁴ ........................ B42D 15/00; B42F 5/00; A63F 1/18; G09B 3/00

[52] U.S. Cl. ...................................... 283/70; 283/903; 273/139; 434/346

[58] Field of Search ................... 283/69, 70, 102, 903; 273/139 R; 434/164, 165, 219, 346, 428, 364; 101/426, 429

[56] References Cited

U.S. PATENT DOCUMENTS

| | | | |
|---|---|---|---|
| 4,095,824 | 6/1978 | Bachman | 434/346 |
| 4,174,857 | 11/1979 | Koza | 283/903 |
| 4,299,634 | 11/1981 | Oberdeck et al. | 283/903 |
| 4,576,399 | 3/1986 | White et al. | 283/903 |
| 4,591,190 | 5/1986 | Clark | 273/139 |
| 4,603,884 | 8/1986 | Burton | 283/903 |
| 4,669,729 | 6/1987 | Solitt et al. | 273/139 |
| 4,725,079 | 2/1988 | Koza et al. | 283/903 |

*Primary Examiner*—Frank T. Yost
*Assistant Examiner*—Paul M. Heyrana, Sr.
*Attorney, Agent, or Firm*—Hedman, Gibson, Costigan & Hoare

[57] ABSTRACT

The method consists of nullifying on a ticket a predetermined number of squares in a first series of squares by the removal of an opaque layer coated thereon and carrying the data to be validated by uncovering, under each square, a respective symbol, and of nullifying all the squares in a second series of squares by the removal of an opaque layer coated thereon and carrying said symbols, except for those squares which carry identical symbols of those uncovered in the first series of squares. If the squares uncovered from the first series identify a date, the presence on a ticket of covered squares in the second series carrying the same symbols as appear in the uncovered squares from the first series certifies that the squares in the second series have been uncovered after uncovering the squares in the first series, thus validating the identified date.

5 Claims, 1 Drawing Sheet

METHOD OF VALIDATING DATA ENTERED ON A TICKET AND THE LIKE

DESCRIPTION

This invention has for its subject a method of validating data entered on tickets and the like, and a ticket implementing the method.

Prize-drawing games organized by newspapers, TV networks, or another mass communication media, are becoming increasingly popular with the general public. The organization of such games provides for the distribution of a multiplicity of tickets, cards, and the like game substrates each having a symbol sequence reproduced thereon, including alphameric characters, patterns, etc. Some symbols, with or without a set distribution, are drawn periodically, e.g. on a daily or weekly basis. The winner is the holder of a ticket or card having all or some of the drawn symbols reproduced thereon. Typical examples of such games are "tombola" and "bingo".

In take part to the game, one is to buys a ticket or a card, certifies the date on which the ticket is admitted to the wager, and later checks the symbols drawn on that date against the symbols reproduced on the ticket for correspondence.

A basic problem of such games is to certify the wager date, certification being required to be performed before a player has a chance of reading the symbols reproduced on his/her ticket.

In such highly popular chance games such as "Lotto" and soccer pool, the wager date is endorsed by a different entity from the player (collection office). This indisputably establishes that a given wager is valid, and hence, that a given ticket is eligible to win.

However, this certifying procedure involves the availability of an extensive and costly organization network quite incompatible with the type and establishment of the games noted above.

On the other hand, if the player is entrusted with certification of the drawing date for which a given wager is to become eligible, a risk is introduced of deceptive situations whereby the player could enter the date or another validating mark on the game substrate after checking the symbols reproduced thereon and their distribution against the drawn symbols.

A prior patent application, No. 20833-A/86, by this Applicant dealt with this same problem. That patent application discloses a method of validating information, specifically the drawing date to be entered by a player on a game substrate before he/she has a chance to check it against drawn symbols. The method provides for the date to be hard copied on a first surface of the game substrate and transferred by a copying method to a second surface of the substrate in a coded form.

While being indisputably effective, that method has revealed some deficiencies. First, problems have been encountered in the manufacture of a suitable game substrate for this type of certification.

Secondly, the certification operations with which the player is entrusted have proved to be relatively complex, being of necessity ruled by a strict sequence of steps which, if not adhered to, involves a significant risk of involuntarily voiding the wager.

The technical problems underlying this invention are to provide a method which affords indisputable validation of data entered by the player on the game substrates, immediate detection of any fradulent actions whereby a player decides to enter the validating data after breaching the game substrate and apprehending the winning set, and has none of the deficiences shown by the cited prior art.

This problem is solved according to the invention by a method which comprises the steps of nullifying on a ticket a predetermined number of squares in a first series of squares by removal of an opaque layer laid thereon, thereby identifying the data to be validated and uncovering, under each square, a respective symbol, and of nullifying all the squares in a second series of squares by removal of an opaque layer laid thereon on which said symbols are reproduced except those squares which carry the same symbols as those uncovered in the first series of squares.

The invention is also concerned with a ticket for implementing this method, which is characterized in that it comprises at least one first series and one second series of squares, coated with an opaque removable layer, a symbol reproduced on the opaque layer of each square and a different symbol reproduced on in a corresponding square underneath said opaque layer, the symbols reproduced under the opaque layer of the first series of squares being substantially identical of the symbols reproduced over said opaque layer of the second series of squares.

In the present context, explicit reference has been made to tickets and the like game substrates of paper; it is understood, however, that the invention is similarly applicable to tickets or substrates intended for other purposes.

The features and advantages of this invention will be more clearly appreciated from the following detailed description of a preferred embodiment thereof, to be taken by way of example and not of limitation in conjunction with the accompanying drawings, where:

Figures 1, 2:
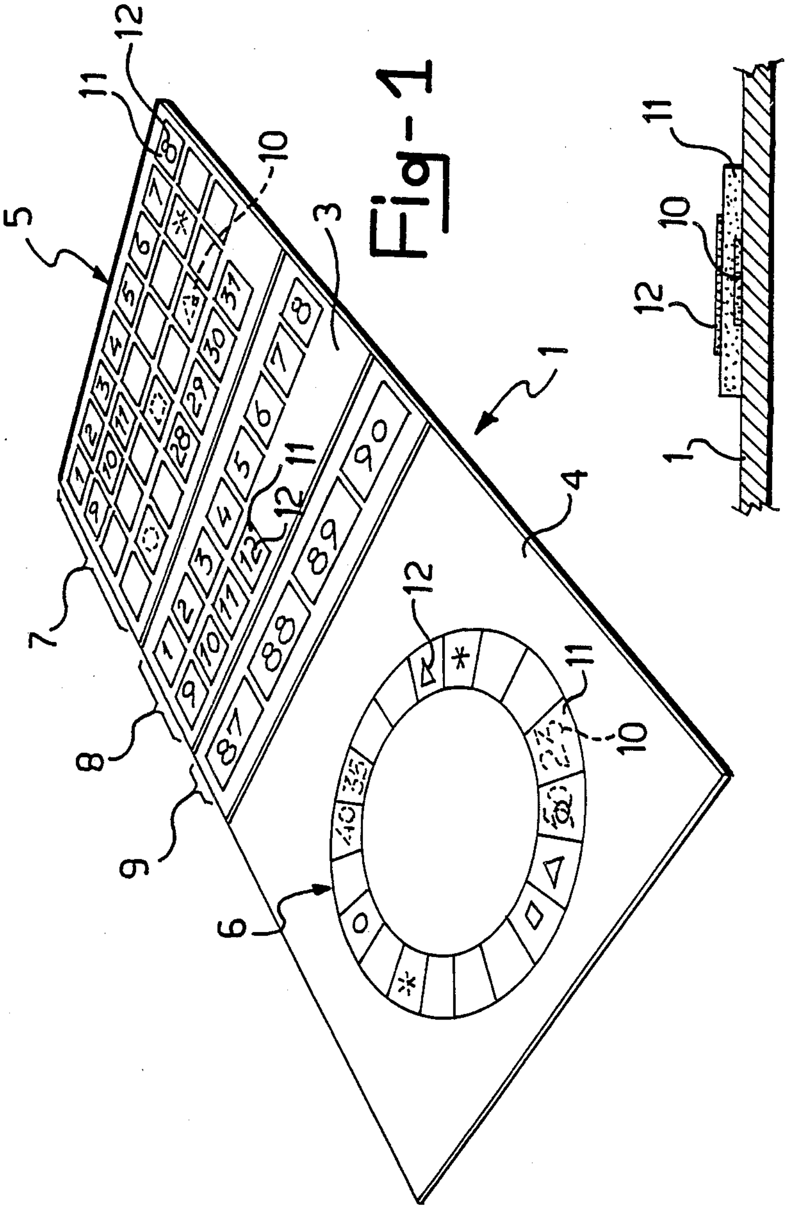
FIG. 1 is a perspective view of a ticket for chance games.
FIG. 2 is an enlarged scale sectional view taken through any of the squares on the ticket of FIG. 1.

In the drawing figures, the reference numeral 1 designates generally a paper substrate in ticket form for a chance game.

On the ticket 1, there are identified two regions indicated at 3 and 4, respectively, having a respective series 5, 6 of squares reproduced on each region.

All the squares are composed as follows. They comprise a symbol 10 reproduced on the paper substrate 1, an opaque layer 11 provided to cover the square and conceal the symbol 10, and a different symbol 12 reproduced on the surface of the opaque layer 11 in full view.

Said opaque layer is obtained by coating the square with a readily removable paint removable either abrasively, as by scratching the square with one's nails, or by commonly available solvents such as water or alcohol. Such paints are known commercially as scratch-out paints and have usually a silvery color.

The squares in the first series 5, reproduced in the region 3, are split into three groups 7, 8 and 9, respectively.

The first square group 7 in the first series 5 comprises thirty-one squares on the opaque layer 11 whereof there is reproduced, as the symbol 12, an increasing numbering between adjoining squares, from one to thirty-one.

The second group 8 in the first series 5 of squares comprises twelve squares on the opaque layer 11 whereof there is reproduced an increasing numbering from one to twelve. Likewise on the opaque layer of the third group 9 of squares there is reproduced an increasing numbering whose symbolic significance will be explained hereinafter.

Such groups of squares are intended for identifying a wager date of the ticket 1. This identification is accomplished by nullifying one square per group 7, 8, 9. The nullified squares are respectively those indicating the day, month, and year of the wager date which one wishes to validate. Nullification is performed by removing the opaque layer 11 from selected squares and leaving the rest of the squares intact.

The symbols 10 reproduced underneath the opaque layer 11 of the first series 5 of squares are different with the corresponding symbols 12 reproduced over the opaque layer. Such symbols 10 would comprise, for example, alphameric characters or patterns and are shown in dash lines on some of the squares in the first group 7. However, it is understood that a symbol 12 will be provided underneath the opaque layer of each square in the first series 5.

The second series 6 of squares comprises nineteen squares, all substantially identical in design with those of the squares in the first series 5.

On the opaque layer 11 of the squares in the series 6 there are reproduced essentially the same symbols as appear underneath the opaque layer 11 of the squares in the first series 5. Underneath the opaque layer 11 of the squares in the series 6, there are reproduced alphanumeric characters or other symbols schematically indicated by dash lines in FIG. 1.

In relation to the ticket just described, the method of this invention provides for the following validation steps of a wager date, for example.

At the time the ticket is purchased by a player, all the squares are coated with the opaque layer 11, and accordingly, the player can only read the symbols 12 reproduced on it.

By removing the opaque layer from a square at each of the groups 7, 8, 9 in the first square series 5, one obtains, as noted previously, identification of a date to be validated. On such removal of the opaque layers 11, the symbols 10 in the squares thus uncovered will become visible.

In order to validate the wager, it will therefore be necessary to remove the opaque layer 11 from all the squares in the second series 6 excepting for those squares whose opaque layer 11 carries a symbol 12 like the symbol 10 uncovered in the first series of squares.

The presence of like symbols in the three uncovered squares of the first series 5 and the three uncovered squares of the second series 6 certifies that the removal of the opaque layer from the second series of squares 6 has been performed subsequently to selecting the validation date identified by the first series 5 of squares, thus inhibiting fradulent actions by the player.

It stands to reason that a like validation effect may be achieved by just uncovering the squares in the second series which carry on the opaque layer 11 identical symbols of those uncovered underneath the opaque layer removed from the squares in the first series and leaving all the other squares covered.

The inventive method enables data other than a wager date to be validated; in particular, it may serve to certify in which order the opaque layers have been removed in the two series of squares.

Thus, the proposed problem is solved by providing accurate and straightforward procedures to have a ticket validated unmistakingly by the player without resorting to auxiliary certifying setups.

Furthermore, the simplicity of the steps provided by this method safeguards the player from involuntarily voiding the wager.

I claim:

1. A method of validating data entered on a ticket having a substrate with a top surface, a first and second series of symbols reproduced on said top surface of said substrate, an opaque layer covering said first and second series of symbols and contacting said top surface of said substrate, and a third series of symbols reproduced on the top surface of said opaque layer and positioned over said symbols of said first and second series, with said first series of symbols being substantially identical to those symbols of said third series positioned over said second series, said method comprising:

(a) removing a predetermined number of symbols of said third series over said first series of symbols along with said opaque layer to uncover a predetermined number of symbols of said first series; and (b) removing said third series of symbols positioned over said second series along with said opaque layer thereover except for those symbols of said third series which are identical to said symbols of said first series uncovered in step (a).

2. A ticket comprising:

(a) a substrate having a top surface;

(b) a first and second series of symbols reproduced on said top surface of said substrate;

(c) an opaque layer covering said first and second series of symbols and contacting said top suface of said substrate; and (d) a third series of symbols reproduced on the top surface of said opaque layer, and positioned over said symbols of said first and second series, with said first series of symbols being substantially identical to those symbols of said third series positioned over said second series.

3. A ticket according to claim 2, wherein those symbols of said third series positioned over said first series are numerals, arrayed in three groups, to denote day, month, and year.

4. A ticket according to claim 2 or 3, wherein said opaque layer is a removable paint, removable by either abrasion or solvent.

5. A ticket comprising:

(a) a paper or plastic coated paper substrate having a top surface;

(b) a first series of number reproduced on said top surface of said substrate, the values of said first series numbers being no higher than 19;

(c) a second series of alphabetic letters;

(d) an opaque removable layer covering said first and second series and contacting said top surface of said substrate; and (e) a third series of numbers reproduced on the top surface of said opaque layer and positioned over said first and second series, said third series comprising at least two groups:

(i) a first group consisting of third series numbers positioned over said first series, said first group being arranged in three sub groups representing day, month and year, wherein the day sub group numbers are from 1 to 31, the month sub group numbers are from 1 to 12, and the year sub group numbers are numbers representing at least the current year; and (ii) a second group consisting of third series numbers positioned over said second series, said second group being arrayed sequentially from 1-19.

* * * * *